United States Patent [19]

Misono et al.

[11] Patent Number: 4,826,238
[45] Date of Patent: May 2, 1989

[54] SIDE SILL FOR AUTOMOTIVE VEHICLE

[75] Inventors: Yoshimasa Misono; Takanobu Ito; Yasuo Muraoka; Atsuyuki Mizuuchi, All of Wako, Japan

[73] Assignee: Honda Giken Kogyo Kabushiki Kaisha, Tokyo, Japan

[21] Appl. No.: 126,151

[22] Filed: Nov. 30, 1987

[30] Foreign Application Priority Data

Dec. 1, 1986 [JP] Japan ............................ 61-183662[U]
Apr. 27, 1987 [JP] Japan ............................ 62-062725[U]

[51] Int. Cl.⁴ ............................................. B62D 25/20
[52] U.S. Cl. .................................... 296/209; 296/205; 296/901; 52/731
[58] Field of Search ...................... 296/209, 31 P, 205; 52/731

[56] References Cited

U.S. PATENT DOCUMENTS

| | | | |
|---|---|---|---|
| 2,269,451 | 1/1942 | Ford | 296/205 |
| 3,528,699 | 9/1970 | Wessells III | 296/209 |
| 3,596,979 | 8/1971 | Hablitzel et al. | 296/31 P |
| 4,552,400 | 11/1985 | Harasaki | 296/209 |

Primary Examiner—Robert R. Song
Attorney, Agent, or Firm—Armstrong, Nikaido, Marmelstein, Kubovcik & Murray

[57] ABSTRACT

A side sill longitudinally extending at each of laterally opposite sides of a lower portion of a vehicle body is provided with a substantially uniform box-like cross-section which is defined by a top and a bottom wall and a right and a left side wall. The side sill is implemented with a hollow molding of aluminum, plastics or like lightweight material which is produced by extrusion molding. To provide the side sill with sufficient rigidity, the top and bottom walls are each provided with a sufficiently greater thickness than the side walls.

5 Claims, 2 Drawing Sheets

SIDE SILL FOR AUTOMOTIVE VEHICLE

BACKGROUND OF THE INVENTION

The present invention relates to a side sill provided on each of a lower right and a lower left portion of the body of an automotive vehicle and, more particularly, to a side sill made of a lightweight material.

An automotive vehicle is necessarily provided with wide openings for accommodating doors at both sides of its body. Since the vehicle body suffers from various kinds of externally derived forces such as vertical bends and longitudinal twists which act around the axis of the vehicle body, a prerequisite is that those portions of the vehicle body which surround the door openings, especially the lower portions, be provided with sufficient rigidity. This prerequisite is generally met by using side sills which are individually located at a lower right and a lower left portions of a vehicle body in such a manner as to extend in the longitudinal direction of the vehicle body. The side sills which serve as reinforcing members for insuring the rigidity of the vehicle body around the door openings as stated above are each provided with a hollow closed cross-section, i.e., a box-like cross-section defined by a top and a bottom wall and a right and a left side wall.

It has been customary to implement a side sill having the above configuration with a sill inner panel and a sill outer panel which are each produced by press-forming a steel sheet having a uniform thickness and provided with flanges at the upper and lower ends thereof. Specifically, the sill inner panel and sill outer panel each having a channel-like configuration are positioned face-to-face and, then, spot-welded together with their upper and lower flanges individually laid one upon the other. To further increase the rigidity as needed, a diagonal reinforcement is put between the upper and lower flanges so as to be spot-welded together with the flanges.

A floor panel interposed between the right and left side sills is usually connected to a side walls of the sill inner panels by spot-welding.

A drawback with the prior art side sill which is made of a steel sheet as stated above is that it has a substantial weight, which obstructs the increasing demand for a lightweight design of a vehicle body that would lead to the cut-down of fuel consumption and others. Another drawback is that the sill inner panel and sill outer panel which are spot-welded together are apt to admit water and others into the side sill, causing the side sill to gather rust. Hence, extra anti-rust measures has to be taken such as providing a seal in each of the joints and/or treating the inner surfaces of the side sill for rust prevention.

In the light of the above, implementing even the side sills which are adapted for the reinforcement of a vehicle body with aluminum, plastics and other lightweight materials has recently come to be discussed. However, in the case that aluminum sheets, for example, are shaped and assembled in the same manner as the traditional steel sheets to produce a side sill, the sill inner panel and sill outer panel cannot be welded together with a sufficient bonding strength due to the property particular to aluminum. Especially, when a diagonal reinforcement is put between the sill inner and sill outer panels which are made of aluminum, it is almost impossible to apply spot-welding to the interconnection of those panels due to the three-layer joint configuration. Adhesive and others which may replace spot-welding stated above would make the sufficient bonding strength even more difficult to achieve.

Further, since aluminum is smaller in the modulus of longitudinal elasticity than steel, an aluminum side sill provided with the same dimensions as the conventional steel side sill would exhibit only insufficient rigidity. Hence, a side sill made of aluminum has to be provided with large cross-sectional dimensions and/or a large wall thickness. However, simply increasing the cross-sectional dimensions of the side sill is undesirable because it reduces the area of the opening available for a door and, thereby, deteriorates the ease of ingress and egress from the passenger compartment. Increasing the thickness of the entire side sill is undesirable also, because such invites an increase in the amount of materail used and, therefore, in the weight of the side sill. Moreover, such a thickness of inner and outer panels further aggravates the difficulty of welding.

In a side sill having a box-like cross-section as described above, stresses are apt to concentrate on the corners defined between the top and bottom walls and the right and left side walls. In addition, since dynamic loads are repeatedly applied to an automotive vehicle while the vehicle is running, substantial stresses are repeately developed in the above-mentioned corners of the side sill. When the side sill is made of aluminum which is relatively susceptible to repetitive loads, cracks are easily produced in the corners of the side sill causing the whole side sill to start breaking at those cracks. This is also true with a side sill which is made of plastics.

For the reasons discussed above, efforts to produce side sills by using lightweight materials have not been made in practice.

SUMMARY OF THE INVENTION

It is, therefore, an object of the present invention to produce a sufficiently rigid side sill by using aluminum and other lightweight materials.

It is another object of the present invention to effectively enhance the rigidity of a side sill which is made of a lightweight material, without affecting the ease of ingress and egress from a passenger compartment.

It is another object of the present invention to produce a side sill with a diagonal reinforcement without resorting to bonding.

It is anothr object of the present invention to enhance the durability of a side sill made of a lightweight material by scattering the stresses which may be developed in corner portions of the side sill.

It is another object of the present invention to provide a side sill made of a lightweight material to which a floor panel can be bonded with ease.

In order to achieve the above objects, in accordance with the present invention, a side sill is implemented with a hollow molding which is produced by protrusion-molding aluminum, plastics and other lightweight materials. The top and bottom walls of the side sill are each formed thicker than the opposite side walls.

Extrusion molding is applicable to the side sill because the latter has a substantially uniform cross-section and extends substantially linearly throughout its length, whereby the side sill having a box-like cross-section is allowed to be molded as a single body. This eliminates the need for an extra step otherwise necessary for bonding a sill inner panel and a sill outer panel together.

The side sill produced by extrusion molding as stated above can be locally varied in thickness. When the top and bottom walls of the side sill are formed thicker than the side walls, the geometrical moment of inertia against bending forces which may act in the vertical direction on the side sill is effectively increased. Specifically, the geometrical moment of inertia is produced by integrating the square of a distance from a neutral axis in a sectional plane with respect to a vertical bend by the area of each portion. The geometrical moment of inertia of the side sill can be increased without increasing the vertical dimension of the side sill, by increasing the sectional area of each of the top and bottom wall which are remotest from the neutral axis.

The side sill having the above structure achieves extremely high rigidity against bending despite th use of a lightweight material such as aluminum or plastics. A vehicle body equipped with such side sills is lightweight and, yet, highly rigid against bending and twisting.

In a preferred embodiment of the present invention, each of the corner portions which are defined between the top and bottom walls and the opposite side walls of the side sill is provided with a larger radius of curvature at its inner perihery than at its outer periphery. This is possible because the side sill is comprised of a hollow molding which is produced by extrusion molding as stated earlier. The corner portion which has a larger radius of curvature at its inner periphery than at its outer periphery is slowly varied in thickness, resulting that each of the comparatively thick top and bottom walls merge smoothly into the comparatively thin side walls. Hence, stresses which may be developed in the corner portions are scattered over a wide area. In addition, the corner portions themselves are thick and, therefore, increased in rigidity.

In another preferred embodiment of the present invention, the box-like hollow side sill includes a diagonal reinforcement which is formed integrally with the top and bottom walls. This is also possible because the side sill is produced by extrusion molding. The diagonal reinforcement serves to further enhance the rigidity of the side sill.

In the case where a side sill is implemented with a single hollow molding as stated above, a difficulty will be experienced in bonding a floor panel to the side sill. Specifically, it is impossible to produce a box-like side sill with a floor panel bonded thereto by bonding the side edge portion of a floor panel to a sill inner panel and, then, bonding a sill outer panel to the sill inner panel, as in the prior art practice. Spot-welding the floor panel directly to the box-like side sill, too, is extremely difficult because the side sill has a substantial length.

In the light of the above, in a preferred embodiment of the present invention, a flange to which a floor panel is to be bonded is molded integrally with a lower portion of one of the side walls of the side sill which is located on the inner side than the other. Such a flange, too, can be easily provided integrally with the side sill. The lower portion of that side wall has high rigidity because it is located in close proximity to the bottom wall which is thick as previously stated. Hence, the flange is capable of supporting the floor panel with sufficient strength.

BRIEF DESCRIPTION OF THE DRAWINGS

The above and other objects, features and advantages of the present invention will become more apparent from the following description taken with the accompanying drawings in which.

DESCRIPTION OF THE PREFERRED EMBODIMENTS

Figure 1:
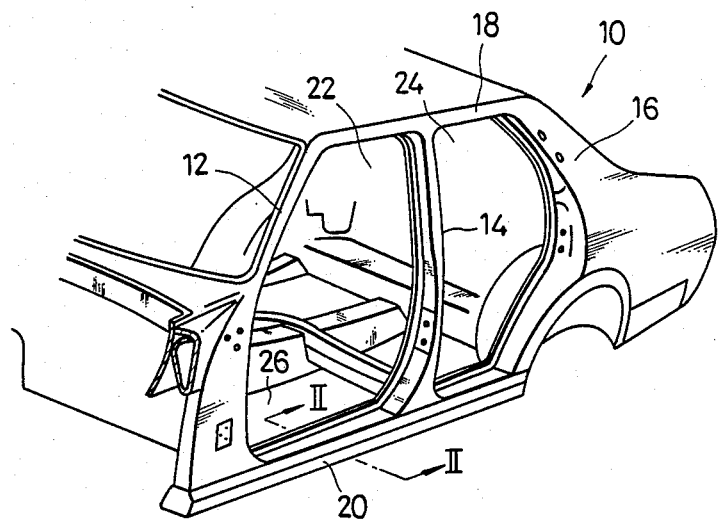
FIG. 1 is a schematic perspective view showing the structure of a body of an automotive vehicle which is provided with side sills in accordance with the present invention.

Referring to FIG. 1 of the drawings, a side body which constitutes a side wall of a vehicle body 10 includes a front pillar 12, a center pillar 14 and a rear pillar 16 each extending generally in the vertical direction, a longitudinally extending roof side rail 18 located above the pillars 12, 14 and 16, and a longitudinally extending side sill 20 located below the pillars 12, 14 and 16. These structural elements 12 to 20 define a pair of openings 22 and 24 each being adapted to accommodate a door. The side sill 20 is provided at each of the right and left sides of the vehicle body 10 although only one is shown. A floor panel 26 is interposed between the side sills 20.

Figure 2:
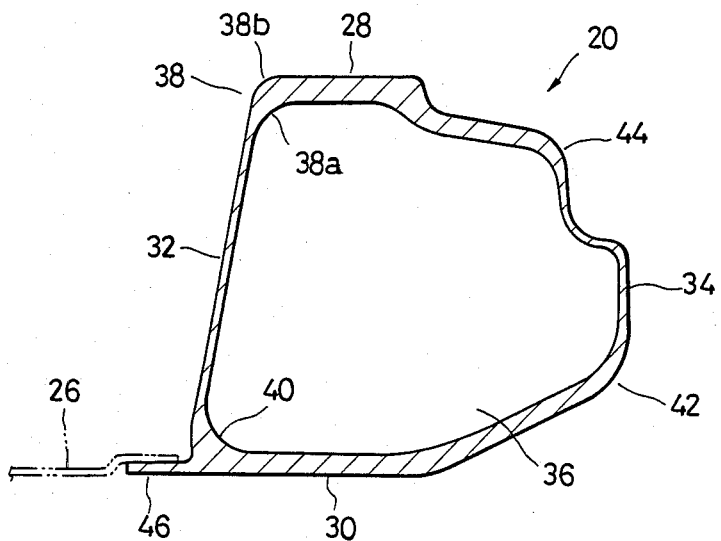
FIG. 2 is a section along line II—II of FIG. 1.

As shown in FIG. 2, the side sill 20 has a hollow box-like cross-section having a space 36 therein which is defined by a top wall 28, a bottom wall 30, and side walls 32 and 34. The side walls 32 and 34 are located on, respectively, the left and right sides as viewed in the drawing, i.e., the inner and outer sides with respect to the vehicle body 10. In this sense, the side walls 32 and 34 will hereinafter be referred to as the inner side wall and the outer side wall, respectively. The side sill 20 comprises a hollow molding of aluminum or plastics which is produced by extrusion molding, so that it has a uniform thickness and extends substantially linearly throughout its length.

The top wall 28 and bottom wall 30 of the side sill 20 are each provided with a greater thickness than the inner and outer side walls 32 and 34. A corner portion 38 which interconnects the top wall 28 and the inner side wall 32 has a greater radius of curvature at its inner periphery 38a than at its outer periphery 38b. This is true with a corner portion 40 between the bottom wall 30 and the inner side wall 32, a corner portion 42 between the bottom wall 30 and the outer side wall 34, and a corner portion 44 between the top wall 28 and the outer side wall 34. In this configuration, the corner portions 38 to 44 are each slowly and continuously changed in thickness from the top wall 32 or the bottom wall 30 toward the comparatively thin side wall 32 or 34, while itself being provided with a substantial thickness.

A flange 46 is formed integrally with the inner side wall 32 to extend out from the bottom wall 30 toward the inner side of the vehicle body 10 beyond the side wall 32. The floor panel 26 is connected at its outer edge portion to the flange 46 by welding or by a bolt and nut assembly.

In the side sill 20 having the above structure, the top wall 28 and the bottom wall 30 which are remotest from the neutral axis with respect to the vertical bend are each provided with a substantial thickness, or area in a cross-section, exerting a substantial geometrical moment of inertia. The side sill 20, therefore, exhibits high rigidity against bending forces. Although the top and bottom walls 28 and 30, respectively, are comparatively thick as stated, each if the side walls 32 and 34 which little affects the geometrical moment of inertia can be formed thin to thereby allow a minimum of increase in the overall weight. Having sufficient rigidity as stated, the side sill 20 does not have to be provided with any substantial dimension in the vertical direction and, therefore, allows the door openings 22 and 24 to be formed wide enough to insure easy ingress and egress from the vehicle body 10.

Further, since the corner portions 38 to 44 of the side will 20 are each slowly and continuously changed in thicknss, a stress developed in any of the corner portions 38 to 44 when a load is applied to the vehicle body 10 is scattered over a wide area. This, coupled with the fact that the corner portions 38 to 44 are comparatively thick, prevents the corner portions 38 to 44 from being cracked.

The locally thickened configuration of the side sill 20 and the difference in radius of curvature between the inner and outer peripheries of the individual corner portions 38 to 40 stated above are attainable by implementing the side sill 20 with a hollow molding which is produced by extrusion molding. It is possible to use such a molding because the side sill 20 has a substantially uniform section and extends substantially linearly throughout its length. Moreover, the side sill 20 implemented with a hollow molding is provided with a box-like section which has no joints, i.e. a hermetically closed configuration. This prevents water and others from entering the internal space 36 of the side sill 20. For this reason, and since the side sill 20 is made of aluminum or plastics, there is no need to treat the inner surfaces of the side sill 20 for protecting them against rust.

As stated earlier, the floor panel 26 is bonded to the flange 46 which extends toward the inner side of the vehicle body 10 from the side sill 20. This promotes easy bonding of the floor panel 26 to the side sill 20, despite that the latter has a box-like section. In addition, since the flange 46 neighbors the side sill bottom wall 30 which is thick and rigid, the floor panel 26 is supported by sufficient strength. Even the flange 46 can be formed integrally with the side sill 20 during extrusion molding of the side sill 20.

Figure 3:
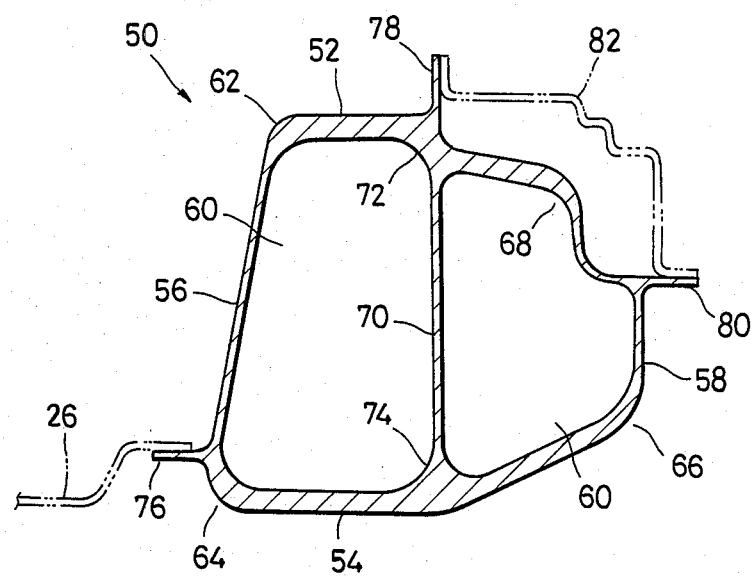
FIG. 3 is a section similar to FIG. 2, showing another embodiment of the present invention.

Referring to FIG. 3, another embodiment of the present invention is shown which includes a diagonal reinforcement. Specifically, the embodiment of FIG. 3 is essentially the same as that of FIG. 2 in that a side sill 50 comprises a hollow molding produced by extrusion molding, in that the side sill 50 has a generally box-shaped cross section, i.e., it has a hollow space 60 defined by a top wall 52 and a bottom wall 54 each being comparatively thick and an inner side wall 56 and an outer side wall 58, and in that each of corner portions 62, 64, 66 and 68 has a larger radius of diameter at its inner periphey than at its outer periphery.

In FIG. 3, a diagonal reinforcement 70 is formed integrally with the top wall 52 and bottom wall 54 to interconnect the substantially intermediate portions of the latter. The diagonal reinforcement 70 is substantially the same in thickness as the side walls 56 and 58, i.e. thinner than the top wall 52 and bottom wall 54. Those portions 72 and 74 of the side sill 50 at which the reinforcement 70 and the top and bottom walls 52 and 54 join each other are each provided with a comparatively large radius of curvature at its inner periphery. Hence, the portions 72 and 74 are each formed relatively thick and smoothly changed in thickness. The reinforcement 70 partitions the space 60 of the side sill 50 into a right and a left chamber and, thereby, reinforces the side sill 50.

A flange 76 extends toward in inside of the vehicle body from the side sill 50 in the vicinity of the lower end of the inner side wall 56, i.e., in a position above the corner portion 64 which is defined between the inner side wall 56 and the bottom wall 54. A substantially vertical flange 78 extends upward from the substantially intermediate point of the top wall 52 of the side sill 50 and in alignment with the diagonal reinforcement 70. Further, a substantially horizontal flange 80 extends outward from the substantially intermediate point of the outer side wall 58 of the side sill 50.

In the above configuration, the diagonal reinforcement 70 provides the side sill 50 with rigidity and strength which are even greater than those of the side sill 20 of FIG. 2. The connecting portions 72 and 74 between the diagonal reinforcement 70 and the top and bottom walls 52 and 54, respectively, are themselves sufficiently strong due to their substantial thickness. The reinforcement 70 can be formed integrally with the side sill 50 because the latter is implemented with a hollow molding, whereby an extra step otherwise needed to bond them together is eliminated. As in the embodiment of FIG. 2, the floor panel 26 is supported by the side sill 50 with its edge portion bonded to the flange 76 and, because the flange 76 neighbors the rigid bottom wall 54, by sufficient strength.

The vertical and horizontal flanges 78 and 80, respectively, allow the pillars 12, 14 and 16, FIG. 1, or a panel member 82 which interconnect their lower ends to be readily bonded to the side sill 50. The panel member 82 is molded integrally with the outer panels of the pillars 12, 14 and 16. Therefore, despite that the side sill 50 is provided with a box-like section beforehand, the vehicle body 10 can be produced by a conventional assembly line.

Since the side sill 50 is produced by extrusion molding, even the flanges 78 and 80 can be easily molded integrally with the side sill 50. With the flanges 78 and 80, the side sill 50 achieves extra rigidity.

Figure 4:
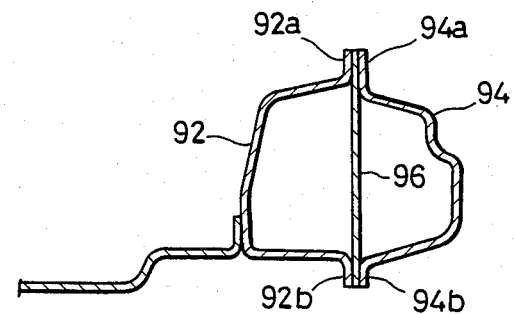
FIG. 4 is a section similar to FIG. 2, showing a prior art side sill.

FIG. 4 shows a prior art side sill of the type having a diagonal reinforcement. As shown, the prior art side sill includes a sill inner panel 92 and a sill outer panel 94 each having a uniform thickness and being press-formed in a channel configuration. The sill inner panel 92 and sill outer panel 94 are located to face each other while, at the same time, a flat diagonal reinforcement 96 is put between upper flanges 92a and 92b and between lower flanges 94a and 94b of the panels 92 and 94, respectively. In such a condition, the panels 92 and 94 and the diagonal reinforcement 96 are bonded together by spot-welding. In the case that the sill inner panel 92, sill outer panel 94 and diagonal reinforcement 96 are made of aluminum, plastics or like lightweight material, it is extremely difficult to bond such a three-layer structure by a sufficient degree of strength. In contrast, the side sill 20 or 50 of the present invention which comprises an integral molding does not need bonding at all and, hence, exhibits considerable rigidity despite the use of a lightweight material.

In the prior art side sill shown in FIG. 4, the upper flanges 92a and 94a and the lower flanges 92b and 94b which extend upward and downward, respectively, are essential for bonding the sill inner panel 92 and sill outer panel 94. The present invention practically eliminates the need for such upper and lower flanges. Even in the embodiment of FIG. 3 which includes the flange 78 extending upward from the side sill 50, at least a downwardly extending flange is omissible. Therefore, when the bottom wall 30 of the side sill 20 or that 54 of the side sill 50 is positioned at the same level as the lower flanges 92b and 94b of the prior art side sill, the side sill 20 or 50 achieves a greater effective sectional area than the prior art side sill while being maintained equal in vertical dimension to the prior art side sill. This adds to the geometrical moment of inertia and, therfore, to the rigidity.

In summary, it will be seen that in accordance with the present invention a highly rigid side sill is obtainable by use of aluminum, plastics and other lightweight materials, promoting the lightweight design of a vehicle body.

Various modifications will become possible for those skilled in the art after receiving the teachings of the present disclosure without departing from the scope thereof. For example, the diagonal reinforcement 70 which has been shown and described as extending substantially vertically may be positioned aslant, if desired. In addition, two or more such diagonal reinforcements may be provided in the side sill.

The side sill 20 shown in FIG. 2 may also be provided with the vertical flange 78 and horizontal flange 80 as shown in FIG. 3.

What is claimed is:

1. A side sill for an automotive vehicle having a generally box-like cross-section in which a space is defined by a top wall, a bottom wall, a right side wall, and a left side wall, comprising:
   a hollow member produced by extrusion molding;
   said top and bottom walls each being thicker than said right and left side walls.

2. A side sill as claimed in claim 1, each of corner portions defined between said top and bottom walls and said side walls has a larger radius of curvature at inner periphery than at outer periphery of said corner portion.

3. A side sill as claimed in claim 1, wherein said space is partitioned by a diagonal reinforcement member which is formed integrally with the interconnects said top and bottom walls.

4. A side sill as claimed in claim 1, wherein a flange for bonding a floor panel thereto is formed integrally with a lower end portion of an inner one of said side walls with respect to a body of the vehicle and adjacent to said bottom wall.

5. A side sill as claimed in claim 1, wherein a vertical flange and a horizontal flange for bonding a panel member which is integral with a pillar panel are provided integrally with an outer one of said side walls with respect to a body of the vehicle.

* * * * *